United States Patent [19]

Dauge

[11] Patent Number: 5,243,163
[45] Date of Patent: Sep. 7, 1993

[54] ELECTRICAL SUPPLY CIRCUIT FOR A LOAD SUCH AS A MAGNETRON

[75] Inventor: Gilbert Dauge, Lagny sur Marne, France

[73] Assignee: Moulinex (Societe Anonyme), Bagnolet, France

[21] Appl. No.: 631,773

[22] Filed: Dec. 19, 1990

[30] Foreign Application Priority Data

Dec. 22, 1989 [FR] France ............................ 89 17144
Jan. 19, 1990 [FR] France ............................ 90 00647

[51] Int. Cl.⁵ .................................................. H05B 41/14
[52] U.S. Cl. ............................. 219/10.55 B; 363/28; 315/106
[58] Field of Search ................ 363/37, 97, 27, 28, 363/135; 315/105, 106, 107; 219/10.55 B

[56] References Cited

U.S. PATENT DOCUMENTS

| | | | |
|---|---|---|---|
| 4,069,449 | 1/1978 | Farnsworth | 363/28 |
| 4,076,996 | 2/1978 | Maehara | 315/106 |
| 4,318,165 | 3/1982 | Kornrumpf et al. | 363/21 |
| 4,885,506 | 12/1989 | Nilssen | 315/102 |
| 5,091,617 | 2/1992 | Maehara et al. | 219/10.55 B |

FOREIGN PATENT DOCUMENTS

| | | | |
|---|---|---|---|
| 0202579 | 11/1986 | European Pat. Off. | |
| 0135043 | 11/1978 | Japan | 219/10.55 B |
| 1050071 | 10/1983 | U.S.S.R. | 363/136 |

*Primary Examiner*—Steven L. Stephan
*Assistant Examiner*—Adolf Berhane
*Attorney, Agent, or Firm*—Young & Thompson

[57] ABSTRACT

Supply circuit adapted to supply a magnetron (1) and comprising a high loss inductive voltage increasing transformer (8) whose primary winding (13) is mounted in series with a commutation element (14) adapted to chop the voltage and whose secondary winding (19) is connected to the load (1). The circuit comprises also a self inductor (17) mounted in series with the primary winding (13) of the transformer (8), as well as a condenser (18) connected in parallel to the primary winding. The commutation element is a unidirectional current gate (14), and the secondary winding (19) of the transformer (8) is directly connected to the load (1). The circuit is useful, for example, in microwave ovens.

12 Claims, 1 Drawing Sheet

ELECTRICAL SUPPLY CIRCUIT FOR A LOAD SUCH AS A MAGNETRON

FIELD OF THE INVENTION

The present invention relates to a supply circuit of continuous or rectified voltage adapted to supply a unidirectional load with current such as, for example, a magnetron and comprising a voltage increasing transformer with high leakage inductance whose primary winding is mounted in series with a commutating element adapted to chop the voltage at a certain frequency in response to a control impulse applied to a trigger of said commutation element, and whose secondary winding is adapted to be connected to said load.

DESCRIPTION OF THE RELATED ART

There are already known such circuits, such as for example that described in U.S. Pat. No. 4,318,165 of General Electric Company. To operate, this circuit requires a commutation element of very large dimensions, and a transformer capable of handling large current surges. Moreover, the current in the load has surges which can hardly be tolerated by a magnetron of a electric kitchen oven.

To overcome certain of these drawbacks, it has been proposed for example to provide a supply circuit such as that disclosed in European application No. 86106467 published under No. 202579 and shown in FIG. 1 of the present application (the different components are identified with the same reference numerals as those used to describe the present invention). Unfortunately, the function of this circuit is not adequate. Thus, the primary current flows principally in the transformer and excites the resonance of the secondary circuit, which requires also that the transformer be so dimensioned that the high magnetizing current will not result in saturation of the circuit. On the other hand, if the secondary so-called "bypass" condenser is of low value and such that the currents in the condenser and the magnetron are of the same order of magnitude, the reverse voltages in the magnetron are very high.

SUMMARY OF THE INVENTION

The present invention has for its object to overcome these drawbacks of the circuits described above.

A supply circuit according to the invention comprises a self induction mounted in series with the primary winding of the transformer, as well as a condenser connected in parallel with said primary winding, and the commutation element comprises a unidirectional current gate, the secondary winding of the transformer being directly connected to the unidirectional load.

Thanks to this circuit, the commutation element is not oversized and works with small loss, and similarly the components of the circuit are not subjected to high reverse voltages and the magnetron receives only moderate peak current.

BRIEF DESCRIPTION OF THE DRAWINGS

The characteristics and advantages of the invention will become apparent from the following description, by way of example, with reference to the accompanying drawing in which.

DETAILED DESCRIPTION OF THE INVENTION

Figure 1:
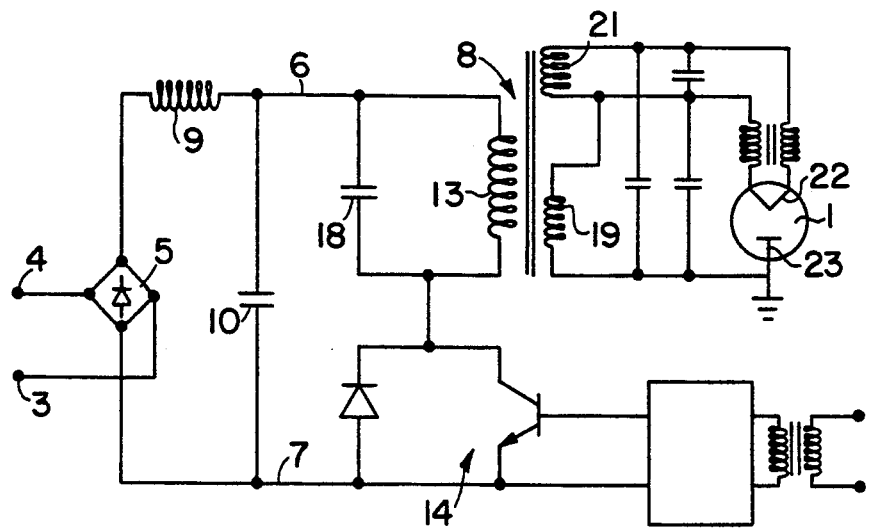
FIG. 1 is a diagram of a supply circuit corresponding to the prior art.
Figure 2:
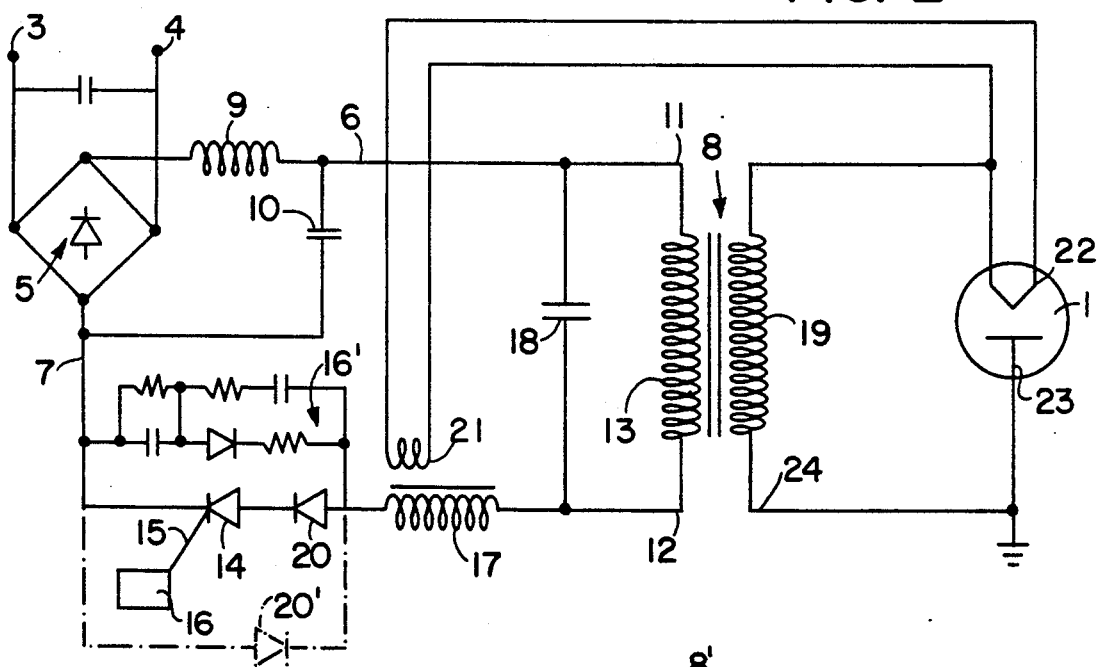
FIG. 2 shows a supply circuit diagram according to the invention.

In the exemplified embodiment described in FIG. 2, the circuit is adapted more particularly to the supply of a magnetron 1 of a microwave oven via an alternating current supply through terminals 3 and 4 of the circuit. These terminals 3 and 4 are connected to a rectifier 5 which is comprised by an alternating double diode bridge and whose output is connected to two supply lines 6 and 7 of a transformer 8. The rectifier 5 comprises an anti-parasitic filter at its outlet constituted by a choke coil 9 and a condenser 10.

The lines 6 and 7 are connected respectively to the ends 11 and 12 of the primary winding 13 of transformer 8. The relative direction of winding of the transformer is termed "FORWARD". Line 7 comprises in known fashion a commutation element 14 having a trigger 15 connected to a control circuit 16 as well as a so-called "CALC" device 16' for assisting in commutation.

According to the invention, the circuit also comprises a condenser 18 connected in parallel to said primary winding 13, as well as a self induction 17 mounted in series with the assembly thus constituted by the condenser 18 and the primary winding 13, and said commutation element 14 is constituted by a unidirectional current gate, and the secondary winding 19 of said transformer 8 is directly connected to the magnetron 1.

The unidirectional current gate is constituted by a "GTO". Instead of this component GTO, one skilled in the art could use and adapt for example the following components "IGBT", "thyristor", etc.

The unidirectional gate 14 is connected in series with a diode 20 preventing reverse current toward the source, thereby ensuring the best ratio: mean injected current to effective current in the primary circuit. This diode 20 is so selected as to be fairly rapid and of sufficient reverse voltage (practically the same value as the direct voltage supported by the gate 14).

According to a modification shown in broken lines in FIG. 2, the diode 20 is replaced by an "anti-parallel" diode 20' which can shunt the gate 14. This mounting of the diode permits reverse passage of a current and thus permits eliminating particularly the circuit "CALC" 16'.

The self induction 17 is coupled to a secondary winding 21, for heating, whose ends are connected to the heating element 22 (cathode) of the magnetron 1. The anode 23 of the magnetron 1 is directly connected to the end 24 of the secondary winding 19, as well as to the ground.

To obtain regular and reliable operation of this circuit it is necessary that the series resonance frequency of the circuit comprising the self induction 17 and the condenser 18 be of the order of 1.5 to 2 times the frequency of chopping of the gate 14, and the parallel resonance frequency of the transformer 8, in the circuit comprising the condenser 18 and the transformer 8 when the gate is in its open condition, be less than said chopping frequency. Moreover, the transformer should have a coupling coefficient of 0.6 to 0.8 and a transformer ratio of 5 to 10.

In practice, it is noted that if a "GTO" is used with a maximum direct voltage of the order of 800 volts, a magnetron whose service voltage is 4 Kv, is necessary to have a transformer ratio of about 7 and a coupling coefficient of 0.7 to 0.8.

Figure 3:
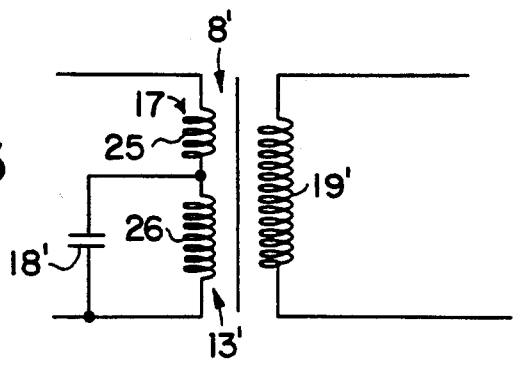
FIG. 3 shows an embodiment of a portion of the circuit of FIG. 2 in which the primary of the transformer is in two parts.

According to a modification shown in FIG. 3, the self induction 17 is comprised by a so-called first part 25 of the primary winding 13' of a transformer 8' which is loosely coupled to the other part 26, so-called the secondary part of the primary, and to the secondary winding 19', while a condenser 18' is connected in parallel to the second part 26 of the primary winding, the unidirectional load 1 being directly connected to the secondary winding 19' loosely coupled with the first and second parts of the primary winding 13'.

To obtain good operation of the circuit of this modification, the following dimensional rules should be followed:

the resonance series frequency of the first and second parts 25, 26 of the primary winding 13' with the condenser 18' is of the order of 1.5 to 2 times the chopping frequency of the gate 14, and the parallel resonance frequency is less than said chopping frequency; the relative direction of winding of the primary 13' and of the secondary winding 19' is "FORWARD" and the coupling coefficient is comprised between 0.5 and 0.8 while the transformation ratio is comprised between 5 and 10.

There will be described hereafter, particularly with reference to FIG. 2, the operation of the supply circuit of the magnetron 1. Alternating current from a commercial source is supplied to terminals 3 and 4 and is rectified by the alternating double bridge diode 5, then freed from parasitic current by the choke coil 9 and the filter condenser 10, and transmitted to the lines 6 and 7 so as to supply, by means of a commutation operation (condition open/condition closed) of the unidirectional current gate 14, the primary winding 13 of the transformer 8 with high frequency current. This high frequency current is tied to the current impulses received by the trigger 15 of gate 14 and delivered by the control circuit 16.

If it is considered that after a certain time of operation the system is stationary when gate 14 is in an open condition, the circuit, oscillating at the parallel resonance frequency, will achieve a voltage close to the maximum load voltage. At this moment, the gate 14 passes to a closed condition. The voltage to the terminals of the gate thus passes from the load value of the condenser 18 increased by the supply voltage, to the value zero, and the current in the primary circuit is controlled by the load of the condenser 18 through the self inductance 17. This current passes through a maximum and then diminishes to zero if the self inductance of the transformer leakage circuit has a sufficient value, the duration of this "arch" being about the half period of series resonance of the circuit.

During this phase, the condenser 18 discharges and recharges in the opposite direction, the voltage at its terminals being reversed and of a value equal to the maximum value considered at the outset, increased by the load arising from the current in the closed gate.

During the following phase, the condenser 18, by oscillating discharge, sends a current through the primary 13 of the transformer 8 which, being of the "FORWARD" type and thanks to the secondary winding of high transformation ratio and loose coupling, supplies to the magnetron 1 a current without an excessive peak.

The magnetron 1 becomes conductive and the intensity increases, governed by the self inductance which limits the value of $$\frac{di}{dt},$$

and thus increases the current pulse in the magnetron while also increasing the decay time of the latter.

As previously explained, the series diode 20 may be replaced by the anti-parallel diode 20'. In this case, it is desirable to choose a transformer having a coupling coefficient of the order of 0.6 and a transformer ratio such that the magnetron being in operation, the decay of the circuit limits the reverse current in the diode 20' to a low value relative to the direct current. Thus the current pulse from the source and identical as to its positive part is followed by a negative part due to the discharge of the condenser 18 in its source. If the decay of the parallel resonance circuit is sufficient, the negative part can be reduced to a negligible value and the operation of the circuit is practically identical to that described for FIG. 2.

As those skilled in the art will understand, the operation of the modification according to FIG. 3 does not need to be exactly described because it resembles that described in FIG. 2.

What is claimed is:

1. Supply circuit of direct or full wave rectified alternating voltage adapted to supply a unidirectional load (1) with current and comprising a high loss voltage-increasing inductive transformer (8), said transformer having a primary winding (13) in series with a commutation element (14) adapted to chop said voltage to a certain frequency in response to a control pulse supplied by a trigger (15) of said commutation element, and a secondary winding (19) adapted to be connected to said load (1), a condenser (18) connected in parallel to said primary winding (13), a self inductor (17) mounted in series with an assembly thus constituted by the condenser (18) and the primary winding (13), said commutation element (14) being constituted by a unidirectional current gate, and the secondary winding (19) of said transformer (8) being directly connected to the load (1).

2. Supply circuit according to claim 1, wherein the series resonance frequency of the circuit comprising the self inductor (17) and the condenser (18) is of the order of 1.5 to 2 times the chopping frequency of the gate (14) and the parallel resonance frequency of the tuned transformer, and the circuit comprising the condenser (18) and the transformer (8) when the gate (14) is in its open condition, is less than said chopping frequency.

3. Supply circuit according to claim 2, wherein the relative direction of the windings (13 and 19) of the transformer (8) is "FORWARD".

4. Supply circuit according to claim 1, wherein the transformer (8) has a coupling coefficient of 0.6 to 0.8 and a transformer ratio of 5 to 10.

5. Supply circuit according to claim 1, wherein the self inductor (17) is comprised by a so-called first part (25) of the primary winding (13') of a transformer (8') which is loosely coupled to another so-called second part (26) of the primary winding, and to the secondary winding (19'), while a condenser (18') is connected in parallel to said second part (26) of the primary winding, the unidirectional load (1) being directly connected to the secondary winding (19') loosely coupled with the first and second parts of the primary winding (13').

6. Supply circuit according to claim 5, wherein the series resonance frequency of the first and second parts (25, 26) of the primary winding (13') with the condenser (18') is of the order of 1.5 to 2 times the chopping frequency of the gate (14), and the parallel resonance frequency is less than said chopping frequency.

7. Circuit according to claim 6, wherein the relative direction of the windings of the primary (13') and of the secondary winding (19') is "FORWARD" and the coupling coefficient is comprised between 0.5 and 0.8 while the transformation ratio is comprised between 5 and 10.

8. Circuit according to claim 1, wherein the unidirectional gate (14) is mounted in series with a diode (20).

9. Circuit according to claim 1, wherein the unidirectional gate (14) is shunted by an anti-parallel diode (20').

10. Circuit according to claim 9, wherein the transformer has a coupling coefficient of the order of 0.6 and a transformation ratio such that the load being in operation, the decay of the circuit limits the reverse current in the anti-parallel diode 20' to a low value before the direct current.

11. Circuit according to claim 1, wherein the unidirectional gate (14) is an electronic component of the "GTO" type.

12. Circuit according to claim 1, wherein the unidirectional load is a magnetron.

* * * * *